United States Patent
Fockler et al.

(10) Patent No.: US 7,278,368 B2
(45) Date of Patent: Oct. 9, 2007

(54) ANCHORING SYSTEM

(75) Inventors: Steven G. Fockler, North Canton, OH (US); Michael H. Lewis, Canton, OH (US)

(73) Assignee: Lockheed Martin Corporation, Akron, OH (US)

( * ) Notice: Subject to any disclaimer, the term of this patent is extended or adjusted under 35 U.S.C. 154(b) by 191 days.

(21) Appl. No.: 11/082,350

(22) Filed: Mar. 16, 2005

(65) Prior Publication Data

US 2006/0054068 A1    Mar. 16, 2006

Related U.S. Application Data

(60) Provisional application No. 60/558,530, filed on Apr. 1, 2004.

(51) Int. Cl.
B63B 21/04 (2006.01)
B61D 45/00 (2006.01)
(52) U.S. Cl. .................. 114/218; 410/109; 410/116; 114/343
(58) Field of Classification Search .............. 114/218
See application file for complete search history.

(56) References Cited

U.S. PATENT DOCUMENTS 2,962,245 A * 11/1960 Molzan et al. ............. 244/115
4,091,744 A * 5/1978 Crissy et al. ............... 410/116

* cited by examiner

*Primary Examiner*—Jesus D Sotelo
(74) *Attorney, Agent, or Firm*—Renner Kenner Greive Bobak Taylor & Weber

(57) ABSTRACT

An anchoring system for securing hardware having an aperture to a deck using a fastener, the anchoring system including a tie-down, an attachment lug configured to engage the tie-down, and a stud extending outwardly from the attachment lug. The tie-down includes a plate with a recess formed therein, and at least two arms traversing the recess. The attachment lug includes a base with a stud receiving aperture formed therein, and a cylindrical sidewall extending outwardly from the base. The cylindrical sidewall of the attachment lug has at least two notches extending partially therearound adapted to receive the at least two arms of the tie-down. The stud is insertable through the aperture in the hardware so that the fastener can be received on the stud to effectively clamp the hardware to the deck.

24 Claims, 5 Drawing Sheets

US 7,278,368 B2

ANCHORING SYSTEM

CROSS REFERENCE TO RELATED APPLICATION

This application claims the benefit of U.S. Provisional Application No. 60/558,530 filed Apr. 1, 2004, which is incorporated herein by reference.

TECHNICAL FIELD

The present invention relates to an anchoring system. In particular, the present invention relates to an anchoring system employing an attachment lug engaging a tie-down provided on the deck of a naval vessel. More particularly, the present invention relates to an anchoring system employing an attachment lug and a tie-down engaged by the attachment lug, the anchoring system providing a secure attachment point for hardware or equipment to the deck of a naval vessel or other platform.

BACKGROUND ART

Oftentimes, it is necessary to secure equipment or hardware to the deck of a naval vessel. One way to secure equipment or hardware is to provide threaded holes in the deck. However, unnecessary damage to the deck is unacceptable to the Navy. Therefore, alternatives to drilling holes in the deck must be provided.

Normally, a plurality of tie-downs are provided on the deck of a naval vessel. These tie-downs are provided to attach cables, straps, or chains to the deck. Such cables, straps, or chains can be used to latch equipment or hardware to the deck. However, cables, straps, or chains cannot provide a rigid connection to the deck. For example, to insure proper functioning thereof, some equipment or hardware (i.e. weapon systems) must be rigidly secured to the deck.

As such, there is a need for an system to rigidly secure hardware or equipment to the deck. Such an anchoring system should use the existing tie-downs to avoid damaging (or otherwise modifying) the deck. More particularly, such an anchoring system should be quick and easy to install, and allow for the temporary or permanent installation of hardware or equipment on the deck.

DISCLOSURE OF THE INVENTION

In general, the present invention contemplates an anchoring system for securing hardware having an aperture to a deck using a fastener, the anchoring system including a tie-down having a plate with a recess formed therein, and at least two arms traversing the recess, the recess having a center, and the at least two arms extending outwardly from the center, an attachment lug having a base including an outer surface with a stud receiving aperture formed therein, and a cylindrical sidewall extending outwardly from the base, the cylindrical sidewall including a transition surface, and having at least two notches extending partially therearound, the at least two notches defining openings formed in the transition surface and receiving portions adapted to receive the at least two arms, and a stud received in the stud receiving aperture formed in the outer surface, wherein, when the at least two arms are inserted through the openings into the at least two notches, rotation of the attachment lug relative to the tie-down positions the at least two arms in the receiving portions to engage the attachment lug with the tie-down, and wherein the tie-down is attachable to the deck, and the attachment lug is engagable with the tie-down, the stud extending outwardly from the attachment lug to be insertable through the aperture in the hardware, the fastener capable of being received on the stud to effectively clamp the hardware to the deck.

The present invention further contemplates a combination tie-down and attachment lug for securing hardware to a deck, the combination tie-down and attachment lug including a tie-down having a plate with a recess formed therein, and at least two arms traversing the recess, the recess having a center, and the at least two arms extending outwardly from the center, an attachment lug comprising a base having an outer surface, and a cylindrical sidewall extending outwardly from the base, the cylindrical sidewall including a transition surface, and having at least two notches formed therein extending from the transition surface partially around the cylindrical sidewall, the at least two notches defining openings formed in the transition surface and receiving portions adapted to receive the at least two arms, and wherein the at least two arms are insertable through the openings into the at least two notches, and wherein rotation of the attachment lug relative to the tie-down positions the at least two arms in the receiving portions to engage the attachment lug with the tie-down.

The present invention still further contemplates an attachment lug for securing hardware to a tie-down having at least two arms, the attachment lug including a base having an outer surface, the outer surface including an aperture formed therein, and a cylindrical sidewall extending outwardly from the base, the cylindrical sidewall including an outer cylindrical surface, an inner cylindrical surface, and a transition surface extending between the outer cylindrical surface and the inner cylindrical surface, where the inner cylindrical surface partially defines a central cavity, the aperture extending from the outer surface to communicate with the central cavity, and wherein the cylindrical sidewall includes at least two notches, the at least two notches extending from the transition surface between the outer cylindrical surface and the inner cylindrical surface around the cylindrical sidewall, the at least two notches defining openings formed in the transition surface and receiving portions to receive the at least two arms.

The present invention also contemplates an attachment lug for securing hardware to a tie-down having arms and positioned on a deck, the attachment lug having a body including a base with an aperture extending therethrough, and a sidewall with notches provided at intervals therearound, where the sidewall extends outwardly from the base, and the notches are adapted to receive the arms of the tie-down.

BEST MODE FOR CARRYING OUT THE INVENTION

Figure 1:
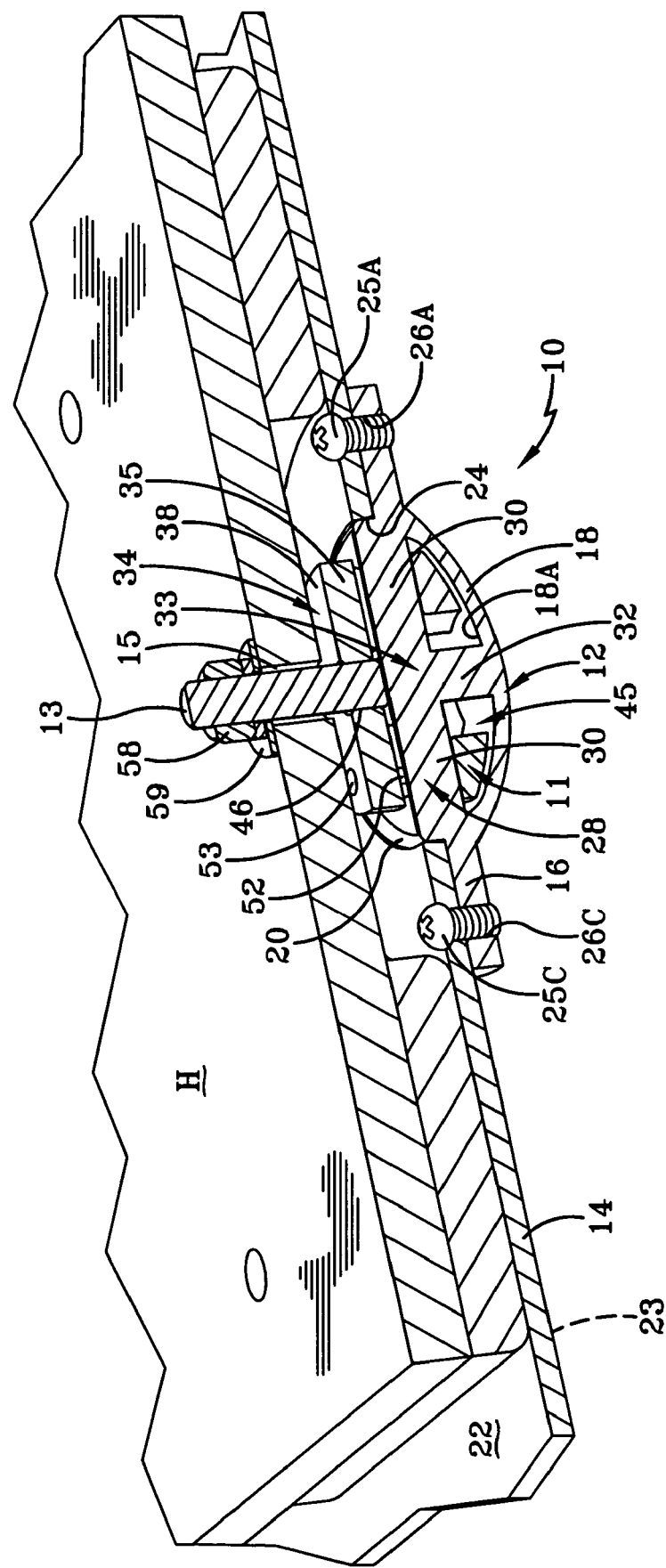
FIG. 1 is a perspective cross-sectional view of an anchoring system, according to the present invention, which secures the base of hardware to the deck of a naval vessel, wherein the anchoring system includes an attachment lug engaging a tie-down attached to the deck.

The anchoring system of the present invention is generally indicated by the numeral 10 in FIGS. 1, 2, 7A and 7B. The anchoring system employs an attachment lug 11, a tie-down 12, and a stud 13 to secure hardware H to the deck 14 of a naval vessel. For example, the tie-down 12 is attached to the deck 14, the attachment lug 11 is attached to the tie-down 12, and the stud 13 is attached to the attachment lug 11 to secure the hardware H to the deck 14. The stud 13 is used as a point of attachment, and to affect its attachment with the attachment lug 11, the stud 13 can be smoothly-surfaced or threaded. As seen best in FIGS. 1 and 2, the stud 13 extends upwardly from the attachment lug 11. The stud 13 is inserted through an aperture 15 (FIGS. 1 and 2) in the hardware H, and is capable of receiving a fastener (such as a nut). As discussed below, the fastener is received on the stud 13 to clamp the hardware H to the deck 14. Although configured for use with a naval vessel, it will be appreciated that the attachment lug 11 is usable with any platform—moveable or stationary—that provides a tie-down or compatible receiving fixture.

Figure 2:
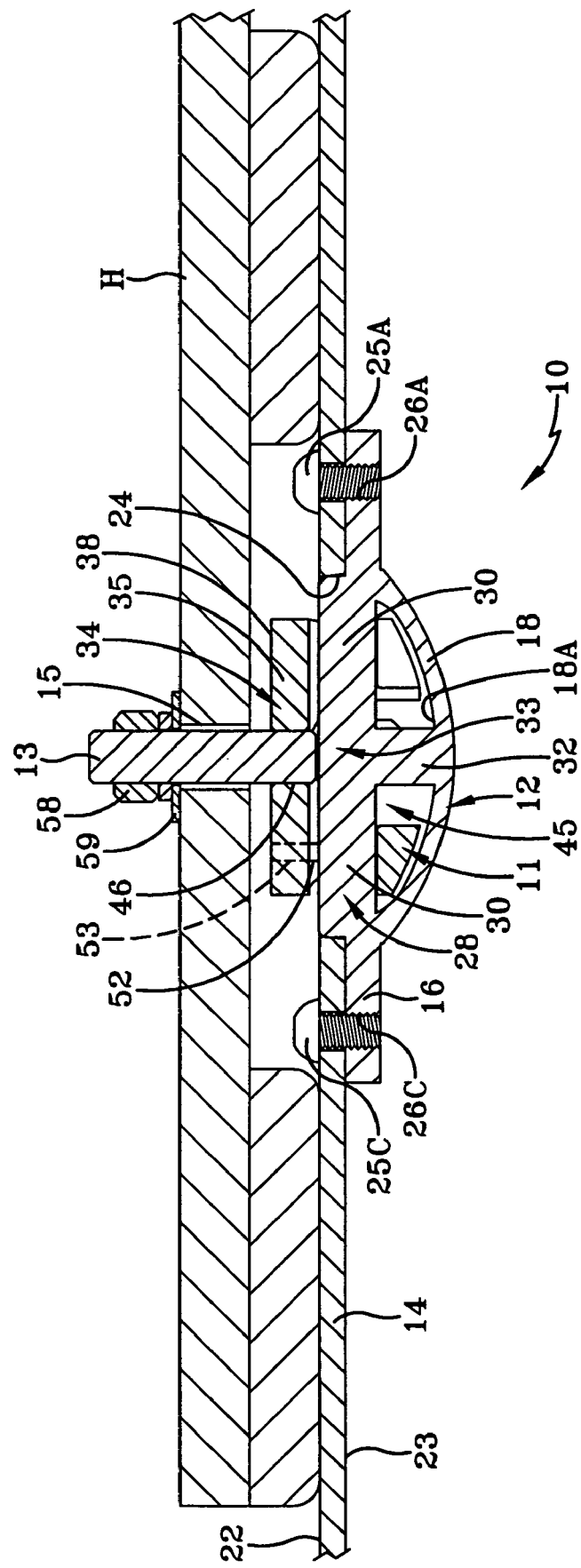
FIG. 2 is an elevational cross-sectional view of the anchoring system depicted in FIG. 1.

Normally, the tie-down 12 is provided on the deck 14 to allow for attachment of ropes, straps, and chains thereto. The tie-down 12 includes a plate 16 having a recess 18 which provides a surface 18A, wherein the plate 16 is fastened to the deck 14 (FIGS. 1 and 2). A rim 20 optionally extends upwardly from the plate 16 around the recess 18.

As seen in FIGS. 1 and 2, the deck 14 includes an upper surface 22 and a lower surface 23. To position the tie-down 12 on the deck 14, the deck 14 provides an aperture 24 extending from the upper surface 22 to the lower surface 23. When the tie-down 12 is installed, the aperture 24 allows for access to the tie-down 12 through the deck 14.

Figure 3:
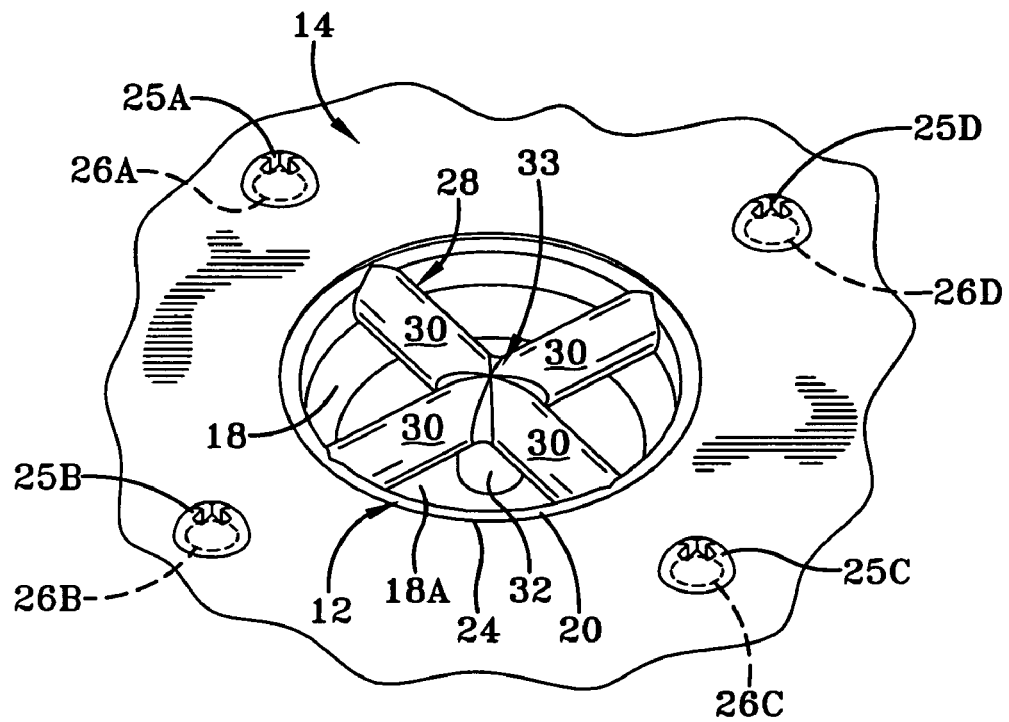
FIG. 3 is a perspective view of the tie-down positioned on the deck.
Figure 4:
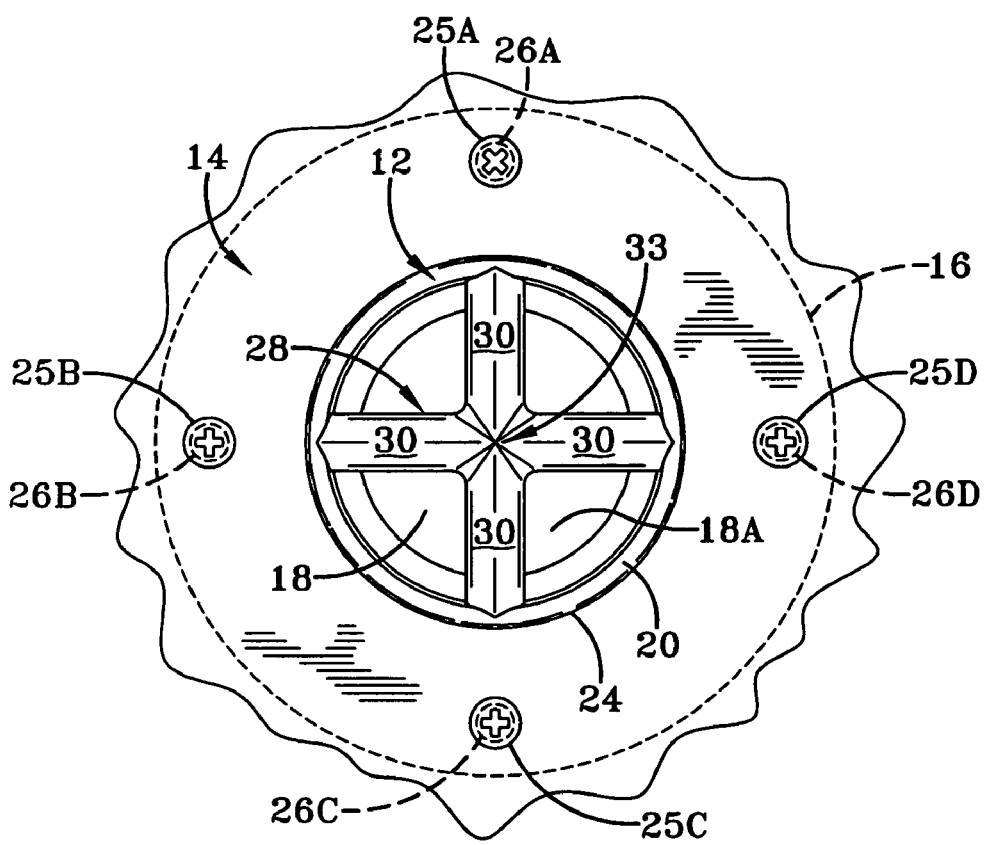
FIG. 4 is a top plan view of the tie-down and deck depicted in FIG. 3.

To install the tie-down 12, the rim 20 is inserted through the aperture 24 so that the plate 16 is interfaced with and positioned adjacent the lower surface 23. Thereafter, the plate 16 is attached to the deck 14 using various fasteners 25A, 25B, 25C, and 25D. The various fasteners 25A, 25B, 25C, and 25D are respectively received in apertures 26A, 26B, 26C, and 26D, which extend through both the tie-down 12 and deck 14 to join the tie-down 12 to the deck 14. As seen in FIGS. 3 and 4, each of the apertures 26A, 26B, 26C, and 26D are spaced around the aperture 24. Each of the apertures 26A, 26B, 26C, and 26D may be in the form of counter-sinks so that a head of each of the fasteners 25A, 25B, 25C, and 25D is flush or below the upper surface 22 when installed. Likewise, the rim 20 does not typically extend above the upper surface 22.

A bracket 28 is integrally formed with the tie-down 12. The bracket 28 extends over the recess 18, and is formed from at least two arms 30. As seen in FIGS. 3 and 4, the bracket 28 includes four arms 30 traversing the recess 18, but, if necessary, the bracket 28 can have two, three, four, or five arms 30. The arms 30 are substantially cylindrical in shape, and can be oriented around a leg 32. The leg 32 extends upwardly from the surface 18A (of the recess 18) to support the bracket 28, and effectively defines the center (generally indicated by the numeral 33 in FIGS. 3 and 4) of the recess 18. As such, as seen best in FIG. 4, the four arms 30 are perpendicularly oriented with respect to one another, and, hence, are spaced 90° apart around the leg 32 (or center 33 of the recess 18) to provide the "X shape" of the bracket 28. However, as discussed above, the bracket 28 can include two arms 30, which, for example, are spaced 180° apart to extend in opposite directions from the center 31.

As discussed above, cables, straps, or chains are normally used in conjunction with the tie-down 12. These cables, straps, or chains are attached to the tie-down 12 around the arms 30. However, the use of cables, straps or chains in conjunction with the tie-downs 12 may not provide the rigidity necessary to secure hardware H to the deck 14. As such, the attachment lug 11 is adapted to engage the tie-down 12, and, using the stud 13, is configured to provide an attachment point enabling the rigid attachment of hardware H to the deck 14.

Figure 5:
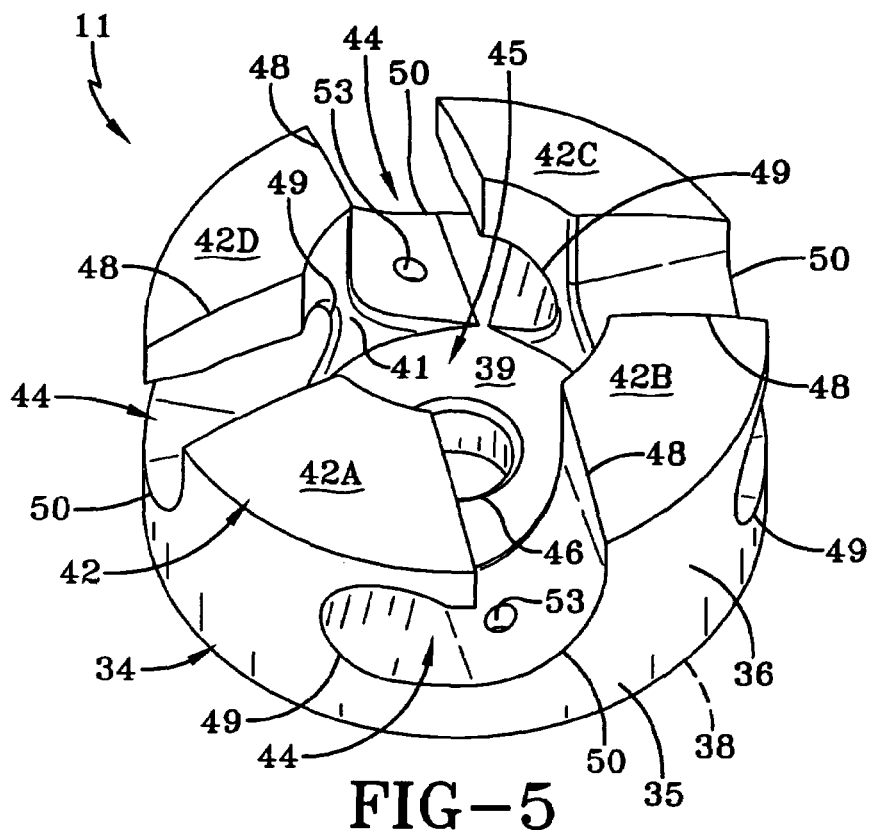
FIG. 5 is a bottom perspective view of the attachment lug.
Figure 6:
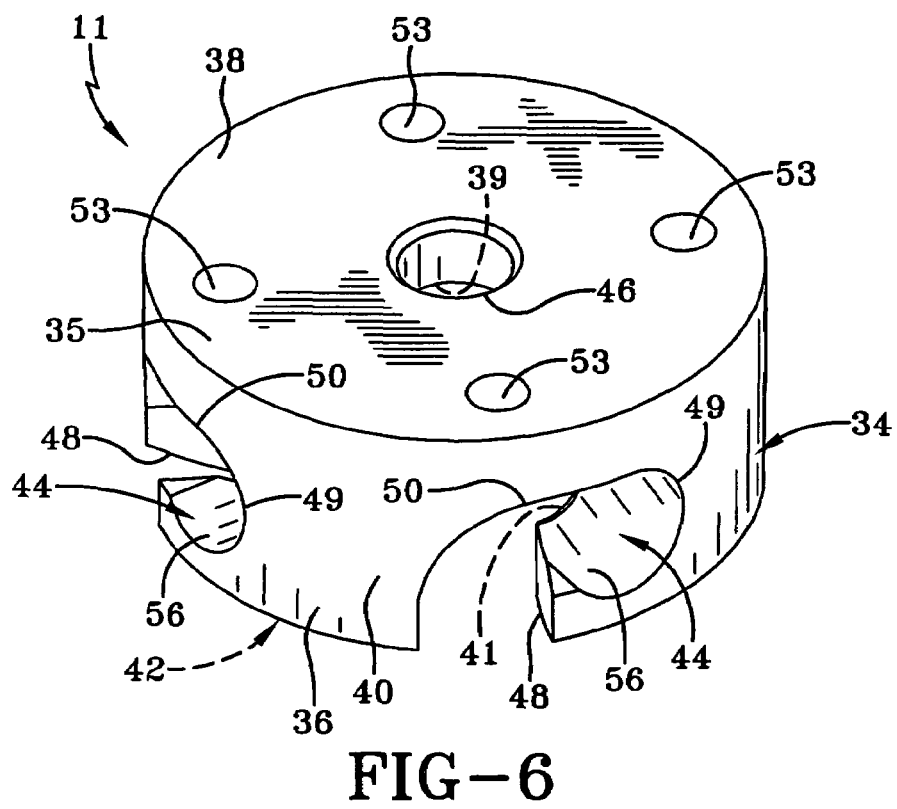
FIG. 6 is a top perspective view of the attachment lug.
Figure 7A:
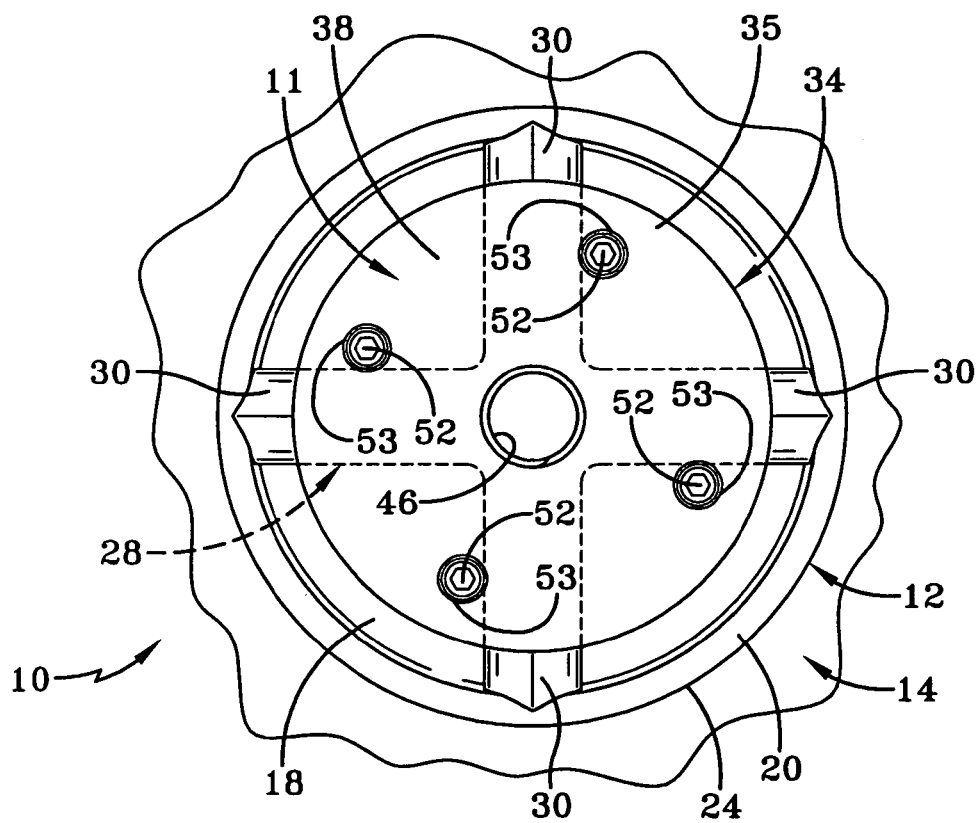
FIG. 7A is a top plan view of the attachment lug engaging the tie-down.
Figure 7B:
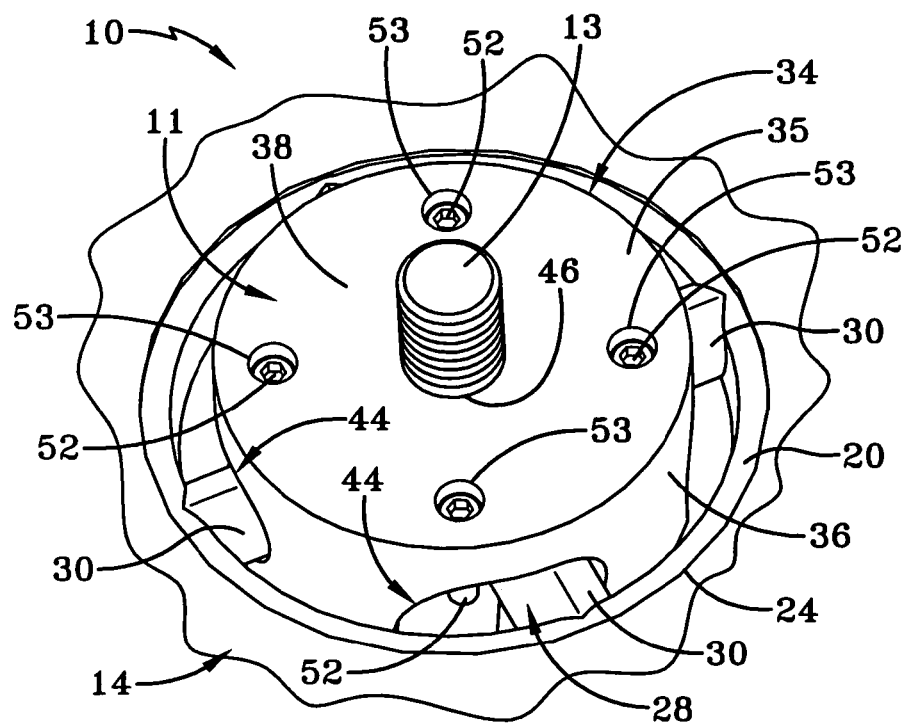
FIG. 7B is a perspective view of the attachment lug engaging the tie-down including a stud extending upwardly from the attachment lug.

As best seen in FIGS. 5 and 6, the attachment lug 11 includes a body 34 (which is ideally stainless steel) having a base 35 and a sidewall 36 extending outwardly from the base 35. The base 35 and sidewall 36 are integrally formed with one another, and, as seen in FIGS. 5 and 6, there is no substantial delineation therebetween. However, the base 35 and sidewall 36 can be formed such that there is a delineation therebetween.

The base 35 includes an outer surface 38 and an inner surface 39. As seen in FIGS. 5 and 6, the sidewall 36 can be cylindrical, and the cylindrical sidewall 36 includes an outer cylindrical surface 40, an inner cylindrical surface 41, and a transition surface 42 joining the outer cylindrical surface 40 and inner cylindrical surface 41. As seen in FIGS. 1 and 2, the transition surface 42 is contoured to match the contour of the bowl-shaped recess 18 (with an ideal clearance of about 0.100 inches provided therebetween) when the attachment lug 11 is engaging the tie-down 12. The transition surface 42 is segmented into four portions 42A, 42B, 42C, and 42D because, as discussed below, the cylindrical sidewall 36 has four notches 44 formed therein. Each of the notches 44 is provided to accommodate one of the arms 30 of the tie-down 12. As such, the number of portions of the transition surface 42 is associated with the number of arms 30 used with the tie-down 12.

The outer surface 38 with the outer cylindrical surface 40 and transition surface 42 (formed from portions 42A, 42B, 42C, and 42D) define the exterior of the attachment lug 11. Furthermore, the inner surface 39 with the inner cylindrical surface 41 form a cavity 45 which defines the interior of the attachment lug 11. When installed, the cavity 45 accommodates the leg 32 and portions of the arms 30.

The outer surface 38 of the base 35 includes an aperture 46. The aperture 46 extends through the base 35 between the outer surface 38 and inner surface 39 to communicate with the cavity 45 and receive the stud 13. The aperture 46 can have smooth surfaces to allow for an interference fit with a smoothly-surfaced stud 13, or can be threaded to receive a threaded stud 13. Furthermore, the cylindrical sidewall 36, as discussed above, includes the notches 44 formed therein. The notches 44 extend between the outer cylindrical surface 40 and inner cylindrical surface 41 partially around the cylindrical sidewall 36.

Each of the notches 44 is configured to receive one of the arms 30. Therefore, provided the notches 44 are properly spaced, the number of notches 44 provided in the cylindrical sidewall 36 is determined by the number of arms 30 used with the tie-down 12. As such, although there can be more notches 44 than arms 30, there must be at least as many notches 44 as arms 30.

For example, as seen best in FIG. 4, because the tie-down 12 includes four arms 30 spaced about 90° apart, the attachment lug 11 includes at least four notches 44 spaced at about 90° intervals around the sidewall 36 to correspond to the spacing of the four arms 30. However, if the tie-down 12 were to include two arms 30 spaced 180° apart, the attachment lug 11 would include at least two notches 44. The at least two notches 44 would be spaced at about 180° intervals around the sidewall 36 to correspond to the spacing of the two arms 30 spaced about 180° apart.

The notches 44 define openings 48 through the transition surface 42 (of the cylindrical sidewall 36), and receiving portions 49 adapted to receive the arms 30. The receiving portions 49 are partially cylindrically shaped, and are sized to receive the arms 30. Furthermore, the notches 44 include transition portions 50 positioned between openings 48 and receiving portions 49. As such, the transition portions 50 (extending from the openings 48 to the receiving portions 49) are used to channel the arms 30 from the openings 48 into the receiving portions 49, and, as seen in FIGS. 5 and 6, can be elbow-shaped.

To attach the attachment lug 11 to the tie-down, the arms 30 are inserted through the openings 48 into the notches 44. Once the arms 30 are located in the transition portions 50, the attachment lug 11 is rotated relative to the tie-down. During the rotation of the attachment lug 11, the transition portions 50 channel and direct the arms 30 toward the receiving portions 49. After the attachment lug 11 is rotated a specified number of degrees, the arms 30 are ultimately positioned in the receiving portions 49, and the attachment lug 11 is engaged with the tie-down 12.

Depending on the orientation of the notches 44, the attachment lug 11 is rotated clockwise or counter-clockwise to affect its engagement with the tie-down 12. As best seen in FIGS. 5 and 6, the attachment lug 11 is configured to be rotated clockwise. Ideally, the notches 44 have dimensions requiring the attachment lug 11 to be rotated approximately 28° to position the arms 30 in the receiving portions 49 after initially being inserted into the transition portions 50.

To lock the attachment lug 11 in place on the tie-down 12 (when the arms 30 are positioned in the receiving portions 49), locking pins 52 are provided. Extending from the outer surface 38 through the attachment lug 11 into the transition portions 50 of each of the notches 44 is a corresponding aperture 53. The locking pins 52 are inserted in the respective apertures 53 which are spaced around the aperture 46. When inserted into the apertures 53, the locking pins 52 effectively trap the arms 30 in the receiving portions 49 to prevent the attachment lug 11 from backing out of the tie-down 12. As such, the locking pins 52 are used to maintain the engagement of the attachment lug 11 with the tie-down 12. As seen in FIG. 6, the apertures 53 can be recessed to ensure that the locking pins 52 do not extend above the outer surface 38. If desired, the locking pins 52 and apertures 53 may be threaded or otherwise configured to maintain the arm 30 in the receiving portions 49.

Once the attachment lug 11 is locked in position on the tie-down 12 using the locking pins 52, the stud 13 is inserted into the aperture 46. The aperture 46 can be smoothly-contoured or threaded to accommodate a smoothly contoured or threaded stud 13. If the stud 13 and aperture 46 are both smoothly contoured, an interference fit is used provide attachment between the stud 13 to the attachment lug 11. However, if the stud 13 and aperture 46 are both threaded, the stud 13 is screwed into position in the aperture 46 to provide attachment between the stud 13 and the attachment lug 11. In addition, rather than being smoothly-contoured or threaded to facilitate attachment in the aperture 46, one end of the stud 13 could be provided with a radially-extending flange. For example, the stud 13 including the radially-extending flange would be inserted through the aperture 46 via the cavity 45, and the radially-extending flange would be interfaced with the inner surface 39 of the base 35. To accommodate the radially-extending flange within the cavity 45, the cylindrical sidewall 36 of the attachment lug 11 may have to be lengthened. Lengthening of the cylindrical sidewall 36 should allow the radially-extending flange to, when the attachment lug 11 is locked in position on the tie-down 12, be trapped between inner surface 39 and bracket 28 of the tie-down 12.

The stud 13 can also be used to further maintain the entrapment of the arms 30 in the receiving portions 49. For example, the aperture 46, as discussed above and as seen in FIGS. 5 and 6, can be configured to extend between the outer surface 38 and inner surface 39 to communicate with the cavity 46. As such, when the stud 13 and aperture 46 are both threaded, the stud 13 can be screwed through the aperture 46 into the cavity 44. Therefore, when the attachment lug 11 is engaging the tie-down 12, the stud 13 can be inserted in the aperture 46 to contact the bracket 28. When stud 13 is in contact with the bracket 28, further rotation of the stud 13 would move the attachment lug 11 upwardly. The upward movement of the stud 13 would eventually force the lower surfaces of the receiving portions 49 (indicated by the numeral 56 in FIG. 6) against the arms 30. Forcing the lower surfaces 56 against the arms 30 effectively clamps the attachment lug 11 in position on the arms 30.

As discussed above, the anchoring system 10 formed from the attachment lug 11, tie-down 12, and stud 13 is used to secure the hardware H to the deck 14. To that end, the tie-down 12 is attached to the deck 14, the attachment lug 11 is attached to the tie-down deck 14, and the stud 13 is attached to the attachment lug 11 to effectuate the attachment of the hardware H. Thereafter, the stud 13 is used as an attachment point for securing the hardware H. For example, the stud 13 is inserted through the aperture 15 (FIGS. 1 and 2) in the hardware H, and is capable of receiving a nut 58. The nut 58 is received on the stud 13 along with an associated washer 59 to clamp the hardware H to the deck 14.

To avoid unwanted damage to the deck 14, the attachment lug 11 can be configured to fail before the tie-down 12. For example, the cylindrical sidewall 36 can be configured such that, when the hardware H is exposed to extreme stresses, it will deform to release the arms 30 from the receiving portions 49 of the notches 44. Therefore, rather than possibly pulling the deck 14 apart during application of extreme stress to the hardware H, the attachment lug 11 will deform to release the hardware H from the deck 14. As such, the anchoring system 10 can be configured prevent damage to the deck 14.

In conclusion, the use of the anchoring system 10 formed from the attachment lug 11, tie-down 12, and stud 13 provides an advantageous attachment point enabling the rigid attachment of hardware H to the deck 14 without the need to provide threaded holes in the deck 14, or otherwise damage the deck 14. Another advantage of the anchoring system 10 is that the carrying naval vessel or other platform can be easily reconfigured for upgrades or changes to the hardware. This effectively reduces the cost or designing and installing the hardware. Still another advantage of the attachment lug 11 is that it can be constructed to deform prior to the deformation of the deck and/or the tie-down. As such, the attachment lug 11 can be configured to fail before the deck and/or the tie-down to avoid unnecessarily damaging the deck and/or tie-down.

Thus, it should be evident that the anchoring system 10 disclosed herein carries out one or more of the objects of the present invention set forth above and otherwise constitutes an advantageous contribution to the art. As will be apparent to persons skilled in the art, modifications can be made to the preferred embodiment disclosed herein without departing from the spirit of the invention, the scope of the invention herein being limited solely by the scope of the attached claims.

What is claimed is:

1. An anchoring system for securing hardware having an aperture to a deck using a fastener, the anchoring system comprising:
    a tie-down comprising a plate with a recess formed therein, and at least two arms traversing said recess, said recess having a center, and said at least two arms extending outwardly from said center,
    an attachment lug comprising a base having an outer surface with a stud receiving aperture formed therein, and a cylindrical sidewall extending outwardly from said base, said cylindrical sidewall including a transition surface, and having at least two notches extending partially therearound, said at least two notches defining openings formed in said transition surface and receiving portions adapted to receive said at least two arms, and
    a stud received in said stud receiving aperture formed in said outer surface,
    wherein, when said at least two arms are inserted through said openings into said at least two notches, rotation of said attachment lug relative to said tie-down positions said at least two arms in said receiving portions to engage said attachment lug with said tie-down, and
    wherein said tie-down is attachable to the deck, and said attachment lug is engagable with said tie-down, said stud extending outwardly from said attachment lug to be insertable through the aperture in the hardware, the fastener capable of being received on said stud to effectively clamp the hardware to the deck.

2. An anchoring system according to claim 1, wherein said at least two notches include transition portions positioned between said openings and said receiving portions, said transition portions capable channeling said at least two arms into said receiving portions during rotation of said attachment lug relative to said tie-down.

3. An anchoring system according, to claim 2 further comprising locking pins to maintain the position of said at least two arms in said receiving portions, wherein said attachment lug includes locking pin receiving apertures extending from said outer surface into said transition portions, the locking pins, when received in said locking pin receiving apertures, preventing said attachment lug from backing out of said tie-down.

4. An anchoring system according to claim 3, wherein said stud is threaded to receive the fastener, the fastener being a nut.

5. A combination tie-down and attachment lug for securing hardware to a deck, the combination tie-down and attachment lug, comprising:
    a tie-down comprising a plate with a recess formed therein, and at least two arms traversing said recess, said recess having a center, and said at least two arms extending outwardly from said center,
    an attachment lug comprising a base having an outer surface, and a cylindrical sidewall extending outwardly from said base, said cylindrical sidewall including a transition surface, and having at least two notches formed therein extending from said transition surface partially around said cylindrical sidewall, said at least two notches defining openings formed in said transition surface and receiving portions adapted to receive said at least two arms, and
    at least one locking pin to maintain the position of said at least two arms in said receiving portions, wherein said attachment lug includes at least one aperture extending from said outer surface into one of said transition portions, said at least one locking pin, when received in said at least one aperture, preventing said attachment lug from backing out of said tie-down,
    wherein said at least two arms are insertable through said openings into said at least two notches,
    wherein rotation of said attachment lug relative to said tie-down positions said at least two arms in said receiving portions to engage said attachment lug with said tie-down, and
    wherein said at least two notches include transition portions positioned between said openings and said receiving portions, said transition portions capable of channeling said at least two arms into said receiving portions during rotation of said attachment lug relative to said tie-down.

6. A combination tie-down and attachment lug according to claim 5, wherein said recess of said tie-down includes a recess surface that is bowl-shaped, said transition surface of said attachment lug being contoured to match said recess surface.

7. A combination tie-down and attachment lug according to claim 6, wherein said tie-down further comprises a leg supporting said at least two arms, said leg extending upwardly from said recess surface through said center of said recess, and wherein said cylindrical sidewall includes an outer cylindrical surface and an inner cylindrical surface, said base and said inner cylindrical surface defining a cavity, said cavity accommodating said leg and portions of said at least two arms supported by said leg.

8. A combination tie-down and attachment lug according to claim 7, wherein said tie-down includes two arms extending in opposite directions, and wherein said attachment lug has two notches formed therein, said receiving portions formed with said two notches being approximately one hundred eighty degrees offset from one another to accommodate said two arms.

9. An combination tie-down and attachment lug according to claim 7, wherein said tie-down includes four arms perpendicularly oriented with respect to one another, and wherein said attachment lug has four notches formed therein, said receiving portions formed with said four notches being approximately ninety degrees offset from one another to accommodate said four arms.

10. A combination tie-down and attachment lug according to claim 5 employing a stud to secure the hardware using a fastener, the hardware having a first aperture adapted to receive the stud, wherein said base of said attachment lug includes a second aperture receiving the stud, and wherein, when said tie-down is attached to the deck, and said attachment lug is engaging said tie-down, the stud extends outwardly from said attachment lug to be inserted through the first aperture in the hardware, the fastener capable of being received on the stud to effectively clamp the hardware to the deck.

11. An attachment lug for securing hardware to a tie-down having a recessed surface with at least two arms traversing the recessed surface, the attachment lug comprising:
   a base having an outer surface, said outer surface having an aperture formed therein, and
   a cylindrical sidewall extending outwardly from said base, said cylindrical sidewall including an outer cylindrical surface, an inner cylindrical surface, and a transition surface extending between said outer cylindrical surface and said inner cylindrical surface, wherein said inner cylindrical surface partially defines a central cavity, said aperture extending from said outer surface to communicate with said central cavity, and wherein said cylindrical sidewall includes at least two notches, said at least two notches extending from said transition surface between said outer cylindrical surface and said inner cylindrical surface around said cylindrical sidewall, said at least two notches defining openings formed in said transition surface and receiving portions adapted to receive the at least two arms, and wherein said transition surface is contoured and adapted to match the contour of the recessed surface.

12. An attachment lug according to claim 11, wherein said at least two notches are configured such that, when the at least two arms are inserted through said openings into said at least two notches, rotation of the attachment lug relative to the tie-down positions the at least two arms in said receiving portions.

13. An attachment lug according to claim 12, wherein said at least two notches include transition portions positioned between said openings and said receiving portions, said transition portions capable channeling the at least two arms into said receiving portions during rotation of the attachment lug relative to the tie-down.

14. An attachment lug according to claim 12, wherein said at least two notches include elbow-shaped transition portions for channeling the at least two arms from said openings into said receiving portions.

15. An attachment lug according to claim 14 for attachment to the tie-down, the tie-down including a center from which two arms extend in opposite directions, wherein said cylindrical sidewall has two notches formed therein, said receiving portions formed with said two notches being approximately one hundred eighty degrees offset from one another to accommodate said two arms.

16. An attachment lug according to claim 14 for attachment to the tie-down, the tie-down including a center from which four arms extend, said four arms being perpendicularly oriented with respect to one another, wherein said cylindrical sidewall has four notches formed therein, said receiving portions formed with said four notches being approximately ninety degrees offset from one another to accommodate said four arms.

17. An attachment lug according to claim 11, wherein engagement of the attachment lug with the tie-down is such that a clearance of about 0.100 inches is provided between said transition surface and the recessed surface.

18. An attachment lug for securing hardware to a tie-down having at least two arms, the attachment lug comprising:
   a base having an outer surface, said outer surface having an aperture formed therein, and
   a cylindrical sidewall extending outwardly from said base, said cylindrical sidewall including an outer cylindrical surface, an inner cylindrical surface, and a transition surface extending between said outer cylindrical surface and said inner cylindrical surface, wherein said inner cylindrical surface partially defines a central cavity, said aperture extending from said outer surface to communicate with said central cavity, and wherein said cylindrical sidewall includes at least two notches, said at least two notches extending from said transition surface between said outer cylindrical surface and said inner cylindrical surface around said cylindrical sidewall, said at least two notches defining openings formed in said transition surface and receiving portions to receive the at least two arms wherein said at least two notches are configured such that, when the at least two arms are inserted through said openings into said at least two notches, rotation of the attachment lug relative to the tie-down positions the at least two arms in said receiving portions,
   wherein the attachment lug employs locking pins to maintain the position of the at least two arms in said at least two notches, and
   wherein the attachment lug includes locking pin receiving apertures extending from said outer surface into said at least two notches, said locking pin receiving apertures positioned so that the locking pins can extend into said transition portions to lock the attachment lug in position with respect to the tie-down.

19. An attachment lug for securing hardware to a tie-down having at least two arms, the attachment lug comprising:
   a base having an outer surface, said outer surface having an aperture formed therein,
   a cylindrical sidewall extending outwardly from said base, said cylindrical sidewall including an outer cylindrical surface, an inner cylindrical surface, and a transition surface extending between said outer cylindrical surface and said inner cylindrical surface, wherein said inner cylindrical surface partially defines a central cavity, said aperture extending from said outer surface to communicate with said central cavity, and wherein said cylindrical sidewall includes at least two notches, said at least two notches extending from said transition surface between said outer cylindrical surface and said inner cylindrical surface around said cylindrical sidewall, said at least two notches defining openings formed in said transition surface and receiving portions to receive the at least two arms, and
   a stud and a fastener to secure the hardware to the tie-down, wherein the stud is received in said aperture formed in said outer surface of said base, and the hardware is received on said stud, said fastener being received on said stud to effectively clamp the hardware to the tie-down.

20. An attachment lug for securing hardware to a tie-down having a recessed surface with at least one arm traversing the recessed surface and positioned on a deck, comprising:
   a body having a base with an aperture extending therethrough, and a sidewall with notches provided at intervals therearound, said sidewall extending outwardly from said base, and said notches adapted to receive the arms of the tie-down, said sidewall including an outer cylindrical surface, an inner cylindrical surface and a transition surface extending between said outer cylindrical surface and said inner cylindrical surface, and wherein said transition surface is contoured and adapted to match the contour of the recessed surface.

21. An attachment lug according to claim 20, wherein said notches include transition portions and receiving portions, said transition portions channeling said arms into said receiving portions as the attachment lug is turned relative to the tie-down.

22. An attachment lug according to claim 20, wherein said base includes various recessed apertures extending therethrough, said recessed apertures spaced around said aperture provided through said base, said various recessed apertures adapted to receive locking pins used to prevent said attachment lug from backing out of said tie-down.

23. An attachment lug according to claim 20, wherein said aperture provided through said base is threaded to receive a threaded stud, said threaded stud used in securing the hardware.

24. An attachment lug according to claim 20, wherein engagement of the attachment lug with the tie-down is such that a clearance of about 0.100 inches is provided between said transition surface and the recessed surface.

* * * * *